United States Patent
Reissner et al.

(10) Patent No.: US 12,181,317 B2
(45) Date of Patent: Dec. 31, 2024

(54) SYSTEM AND METHOD FOR IMPROVED MEASUREMENT OF A FLOW OF FLUID THROUGH A CHANNEL

(71) Applicant: BELIMO HOLDING AG, Hinwil (CH)

(72) Inventors: Patrick Reissner, Herrliberg (CH); Lucien Buchmann, Rapperswil (CH)

(73) Assignee: BELIMO HOLDING AG, Hinwil (CH)

( * ) Notice: Subject to any disclaimer, the term of this patent is extended or adjusted under 35 U.S.C. 154(b) by 237 days.

(21) Appl. No.: 17/774,407

(22) PCT Filed: Dec. 23, 2020

(86) PCT No.: PCT/EP2020/087761
§ 371 (c)(1),
(2) Date: May 4, 2022

(87) PCT Pub. No.: WO2021/130309
PCT Pub. Date: Jul. 1, 2021

(65) Prior Publication Data
US 2022/0381596 A1    Dec. 1, 2022

(30) Foreign Application Priority Data
Dec. 23, 2019    (CH) .................................. 01696/19

(51) Int. Cl.
 *G01F 1/667*    (2022.01)
 *G01F 1/66*    (2022.01)
(52) U.S. Cl.
 CPC .............. *G01F 1/667* (2013.01); *G01F 1/662* (2013.01)

(58) Field of Classification Search
 CPC .................................. G01F 1/662; G01F 1/667
 See application file for complete search history.

(56) References Cited

U.S. PATENT DOCUMENTS

| | | | |
|---|---|---|---|
| 4,515,021 A | 5/1985 | Wallace et al. | |
| 5,117,698 A | 6/1992 | Baumoel | |
| (Continued) | | | |

FOREIGN PATENT DOCUMENTS

| | | | | |
|---|---|---|---|---|
| EP | 1113247 A1 | 7/2001 | | |
| GB | 2363455 A | * 12/2001 | ............. | G01F 1/662 |
| (Continued) | | | | |

OTHER PUBLICATIONS

Communication issued Apr. 18, 2024 in European Application No. 20 838 558.3.

(Continued)

*Primary Examiner* — Andre J Allen
(74) *Attorney, Agent, or Firm* — Sughrue Mion, PLLC (57) ABSTRACT

An HVAC flow measurement system (1) comprises an ultrasonic flowmeter (2) for measuring a flow of gas through a channel (3). The ultrasonic flowmeter (2) comprises ultrasonic transducers (20, 21) arranged at a distance L from each other in flow direction f. The ultrasonic transducers (20, 21) are configured to emit an ultrasonic pulse into the channel (3) and to receive an ultrasonic pulse in the channel (3). The flowmeter (2) further comprises a processor (200) connected to the two ultrasonic transducers (20, 21) and configured to measure transit times in such a manner that a flow velocity of the fluid and at least one characteristic parameter(s) of the channel (30) are determined by using the transit times.

33 Claims, 5 Drawing Sheets

(56) References Cited

U.S. PATENT DOCUMENTS

| | | | |
|---|---|---|---|
| 5,553,505 | A | 9/1996 | Bignell et al. |
| 6,330,831 | B1 | 12/2001 | Lynnworth et al. |
| 6,345,539 | B1 | 2/2002 | Rawes et al. |
| 6,494,105 | B1 | 12/2002 | Gallagher |
| 6,584,860 | B1 | 7/2003 | Feller et al. |
| 7,201,065 | B1 | 4/2007 | Feller |
| 7,581,453 | B2 | 9/2009 | Gen |
| 8,302,455 | B2 | 11/2012 | Straub, Jr. |
| 9,453,749 | B1 | 9/2016 | Bachmann et al. |
| 9,671,261 | B2 | 6/2017 | Hayashi |
| 10,036,763 | B2 * | 7/2018 | Hies .................... G01F 1/662 |
| 10,837,816 | B2 * | 11/2020 | Mayle .................... G01F 1/86 |
| 10,928,414 | B2 * | 2/2021 | Hies .................... G01P 5/244 |
| 11,237,034 | B2 | 2/2022 | Funck |
| 11,268,725 | B2 | 3/2022 | Chen et al. |
| 2008/0156107 | A1 * | 7/2008 | Ao .................... G01F 1/663 73/861.27 |
| 2010/0095782 | A1 | 4/2010 | Ferencz et al. |
| 2011/0162461 | A1 | 7/2011 | Allen |
| 2012/0204620 | A1 | 8/2012 | Straub, Jr. |
| 2014/0067135 | A1 | 3/2014 | Lehnert et al. |
| 2014/0083202 | A1 | 3/2014 | Wiest et al. |
| 2014/0352399 | A1 | 12/2014 | Vaissiere |
| 2018/0328956 | A1 | 11/2018 | Hies et al. |
| 2019/0011300 | A1 | 1/2019 | Gloss et al. |
| 2020/0141604 | A1 | 5/2020 | Chen et al. |
| 2020/0173824 | A1 | 6/2020 | Funck |
| 2022/0373373 | A1 * | 11/2022 | Reissner .................... G01F 1/662 |
| 2022/0381595 | A1 * | 12/2022 | Reissner .................... G01F 1/667 |
| 2022/0381596 | A1 | 12/2022 | Reissner |

FOREIGN PATENT DOCUMENTS

| | | | | |
|---|---|---|---|---|
| JP | 2005-241581 A | 9/2005 | | |
| JP | 2012-002625 A | 1/2012 | | |
| JP | 2014137369 A * | 7/2014 | ............... | G01F 1/66 |
| WO | 2010/122117 A1 | 10/2010 | | |
| WO | WO-2015063079 A1 * | 5/2015 | ............... | G01F 1/66 |
| WO | 2015/154777 A1 | 10/2015 | | |
| WO | 2018/233984 A1 | 12/2018 | | |
| WO | 2019/010603 A1 | 1/2019 | | |

OTHER PUBLICATIONS

International Search Report for PCT/EP2020/087761 dated Apr. 12, 2021 [PCT/ISA/210].
Written Opinion for PCT/EP2020/087761 dated Apr. 12, 2021 [PCT/ISA/237].
Swiss Search Report for CH 16962019 dated May 4, 2020.
Communication issued Apr. 18, 2024 in European Application No. 20 838 557.5.
Communication issued Apr. 22, 2024 in European Application No. 20 838 556.7.
International Search Report of PCT/EP2020/087759 dated Apr. 16, 2021 [PCT/ISA/210].
Written Opinion of PCT/EP2020/087759 dated Apr. 16, 2021 [PCT/ISA/237].
Office Action issued Apr. 24, 2024 in U.S. Appl. No. 17/774,261.
Office Action issued Jul. 12, 2024 in U.S. Appl. No. 17/774,261.
International Search Report of PCT/EP2020/087760 dated Apr. 7, 2021 [PCT/ISA/210].
Written Opinion of PCT/EP2020/087760 dated Apr. 7, 2021 [PCT/ISA/237].

* cited by examiner

Fig. 8 ent claims and claim combinations can provide further improvements.

SYSTEM AND METHOD FOR IMPROVED MEASUREMENT OF A FLOW OF FLUID THROUGH A CHANNEL

CROSS REFERENCE TO RELATED APPLICATIONS

This application is a National Stage of International Application No. PCT/EP2020/087761 filed Dec. 23, 2020, claiming priority based on Swiss Patent Application No. 01696/19 filed Dec. 23, 2019, the contents of each of which being herein incorporated by reference in their entireties.

FIELD OF THE INVENTION

The present invention relates to system and method for measuring the flow of gas through a channel. Specifically, the present invention relates to a flow measurement system and a method of measuring a flow of gas through a channel, using an ultrasonic flowmeter.

This application makes reference to the Swiss priority application No. 01696/19 filed on 23 Dec. 2019 by Belimo Automation AG, the content of which is herewith enclosed by reference in its entirety, including the claims, figures and complete description.

BACKGROUND OF THE INVENTION

WO 2010/122117 describes a ventilation system which draws air from an exterior of a building through a ventilation duct into an interior of the building. The ventilation system has an ultrasound sensor positioned in the ventilation duct upstream and/or downstream of the ventilator for measuring the volume flow. The ultrasound sensor of WO 2010/122117 comprises a pair of ultrasonic transceivers which are mounted in a spaced apart relationship facing each other on opposing surfaces of the ventilation duct, emitting and receiving ultrasound waves in an angle of 60-90 degrees relative to the surface of the ventilation duct. In a controller, the phase difference and time-of-flight difference between the transmitted and received ultrasonic signal are determined and used to calculate the velocity and temperature of the air and to control these parameters by a controller that communicates with a valve to regulate the temperature and velocity of the airflow and controlling the fan speed and the temperature of the ventilation unit by communication through the control box on the valve.

US 2014/083202 A1 discloses an ultrasonic flow measuring device providing signal paths in and against flow direction that are formed by linear path segments arranged in series in an approximate helical manner by multiple reflections at the channel wall. This allows to determine the flow profile.

WO 2015/154777 A1 discloses a system for control of inlet air. Actual flow is measured and if a difference to a fixed value exists then a damper can be adjusted so that the correct air flow is achieved.

In known flow measurement systems, the shape and size of the channel and the gas temperature are used in determining an average velocity of the fluid flow. Thus, variations in channel cross section can negatively influence the measurement in an uncontrolled manner. Furthermore, calibration of flow measurement systems must typically be done at the installation site and requires provision of a range of varying flow velocities.

SUMMARY OF THE INVENTION

Therefore, it is an object of the invention to provide an improved flow measurement system or flowmeter and an improved method using such a flow measurement system or flowmeter and an improved computer program product for controlling such a method, and in particular to provide a flow measurement system and method with improved measurement accuracy in channels of various shapes and sizes. These objects are achieved by the subject-matter of the independent claims. Some embodiments as given in dependent claims and claim combinations can provide further improvements.

The invention broadly encompasses a flow measurement system or flowmeter and a method for measuring a flow of fluid through a channel by using such a flow measurement system or flowmeter and a computer program product comprising a non-transitory computer-readable medium having stored thereon computer program code configured to control performing such a method, wherein the flow measurement system comprises an ultrasonic flowmeter for measuring a flow of fluid through a channel, the channel has an axial extension determining a flow direction of the fluid and a cross section characterizable by at least one characteristic parameter, the ultrasonic flowmeter comprising at least two ultrasonic transducers, in particular two ultrasonic transducers, that are arranged at a distance L from each other, when the ultrasonic flowmeter is fixed to the channel, and that are configured to emit ultrasonic pulses into the channel and to receive ultrasonic pulses in or from the channel, the ultrasonic flowmeter further comprising a processor connected to the two ultrasonic transducers, wherein the at least two ultrasonic transducers are arranged to emit and receive ultrasonic pulses, and the processor is configured to measure transit times of the ultrasonic pulses in the channel in such a manner that a flow velocity of the fluid is determined by using the transit times. In particular, the flow measurement system and method and computer program product of the invention can have advantages such as: improved measurement accuracy, simplified adaptability to channels with cross sections of different shapes and sizes, and simplified calibration.

The following embodiments include modifications, improvements and/or variations of the flow measurement system, method and computer program product according to the present invention.

In embodiments, the at least two ultrasonic transducers, in particular exactly two ultrasonic transducers, can be arranged to emit and receive ultrasonic pulses, and the processor can be configured to measure transit times of the ultrasonic pulses in the channel in such a manner that, in addition to determining a flow velocities of the fluid, the one or more characteristic parameter(s) of the channel is or are determined by using the transit times. This allows to determine an average flow velocity of the fluid, in particular gas or air, independent from the geometry or dimensions of the channel, and in particular independent from the fluid temperature. Thereby, a more precise and more robust measurement of fluid flow can be achieved. Furthermore, calibration of the flow measurement system need not be made on the installation site, but can instead be made at a reference channel. In addition, a simplified and improved calibration of the ultrasonic flowmeter electronics can be made. It is also possible to determine the fluid or gas temperature without using a temperature sensor.

In embodiments, the flow measurement system can comprise the channel, in particular an axial section of the channel to which the ultrasonic flowmeter is fixed and in which the ultrasonic pulses to be evaluated in the processor can propagate.

In embodiments, the flow paths between the at least two ultrasonic transducers can be arranged such and the processor is configured such that an average flow velocity averaged over the cross section of the channel is determined. In further embodiments, the processor is configured to determine at least one of: a cross-sectional shape of the channel, a cross-sectional area of the channel, a volume flow of the fluid, combinations thereof.

By measuring a characteristic parameter(s) of the channel and a flow velocity, an average flow velocity and/or a flow profile and/or a total flow can be determined with enhanced precision, even when the channel cross section may change over time, such as caused by contamination of inner channel walls, e.g. through sedimentary chalky deposits.

In embodiments, the characteristic parameter can be selected from the group consisting of: a cross-sectional length through the channel cross section, a diameter D of the channel, a width W of the channel, a height of the channel, and combinations thereof. In further embodiments, the characteristic parameter can be used for determining at least one of: a cross-sectional shape, a cross-sectional area of the channel, a flow profile, i.e. a flow velocity distribution over the cross section of the channel, and combinations thereof.

In embodiments, the at least two ultrasonic transducers can be arranged to emit and receive ultrasonic pulses traveling along at least two paths, that have different path lengths and/or different angular orientations with respect to the flow direction f.

In first preferred embodiments, the ultrasonic flowmeter can comprise two ultrasonic transducers that are configured to measure transit times of ultrasonic pulses propagating downstream relative to the flow direction f, of ultrasonic pulses propagating upstream relative to the flow direction f, and of ultrasonic pulses propagating substantially independently from the flow of fluid. In particular, the processor can be configured to determine a speed of sound and therefrom a temperature of the fluid; and/or the processor can be configured to determine the flow velocity of the fluid independently from the speed of sound and independently from the temperature of the fluid.

In embodiments, the cross section of the channel has a shape selected from the group consisting of: a round shape, a partially round shape with at least one flattened face, a rectangular shape, a polygonal shape, and combinations thereof.

In second preferred embodiments, that are alternative or in addition to the first preferred embodiments, the ultrasonic flowmeter can comprise two ultrasonic transducers that are fixed to the channel at a known mutual distance L and can be configured to measure an absolute transit time along a known path across a cross section of the channel, the flow measurement system can further comprise a temperature sensor configured to determine a temperature and speed of sound of the fluid in the channel, and the processor can be configured to determine the one or more characteristic parameter(s), in particular a diameter or width, of the channel, using the absolute transit time and the speed of sound of the fluid or gas. In particular, the same two ultrasonic transducers can also be configured to measure the transit times for determining the flow velocity of the fluid.

An aspect of the invention is related to a method for measuring a flow of fluid through a channel by using a flow measurement system comprising an ultrasonic flowmeter, in particular the flow measurement system as disclosed herein, wherein the channel has an axial extension determining a flow direction of the fluid and a cross section characterizable by at least one characteristic parameter, the ultrasonic flowmeter comprising at least two ultrasonic transducers, in particular two ultrasonic transducers, arranged at a distance from each other, when the ultrasonic flowmeter is fixed to the channel, and the ultrasonic flowmeter further comprising a processor connected to the two ultrasonic transducers, wherein ultrasonic pulses are emitted into the channel and ultrasonic pulses are received from the channel by the at least two or two ultrasonic transducers, and in the processor transit times of the ultrasonic pulses in the channel are measured and a flow velocity of the fluid and the one or more characteristic parameter(s) of the channel are determined by using the transit times.

In embodiments of the method, in the processor a difference in transit times or inverse transit times of ultrasonic pulses travelling downstream and upstream relative to the flow direction f can be measured, and by using the difference in transit times or inverse transit times the flow velocity can be determined; and/or at least one absolute transit time of ultrasonic pulses can be measured, and by using the at least one absolute transit time the one or more characteristic parameter(s) of the channel can be determined.

In further embodiments of the method, in the processor at least one further method step can be performed that is selected from: determining a cross-sectional shape of the channel, determining a cross-sectional area of the channel, determining a volume flow of the fluid; determining a speed of sound of the fluid, determining a temperature of the fluid, determining the flow velocity of the fluid independently from the speed of sound, determining the flow velocity of the fluid independently from the temperature of the fluid, and combinations thereof.

In third preferred embodiments relating to a calibration system and calibration method and being alternative or in addition to any embodiments disclosed herein, a flow measurement system or method, in particular as disclosed herein, comprises an ultrasonic flowmeter for measuring a flow of fluid through a channel, the ultrasonic flowmeter comprising at least two ultrasonic transducers that are arranged at a distance L from each other, when the ultrasonic flowmeter is fixed to the channel, and that are configured to emit ultrasonic pulses into the channel and to receive ultrasonic pulses in the channel, the ultrasonic flowmeter further comprising a processor connected to the at least two or two ultrasonic transducers, wherein the at least two ultrasonic transducers are arranged to emit and receive ultrasonic pulses, and the processor is configured to measure transit times of the ultrasonic pulses in the channel in such a manner that a flow velocity of the fluid is determined by using the transit times, wherein further the processor is configured to determine an electronics-uncompensated calibration function for the volume flow versus transit times by using a characteristic parameter(s) of the channel or a reference channel of known geometry and by using a measured temperature or a reference temperature of the fluid, and the processor is configured to determine, using the electronics-uncompensated calibration function, an electronics-compensated calibration function for compensating electronic signal transit times occurring in the electronic signal paths of the ultrasonic flowmeter. In embodiments, in the processor a difference in transit times or inverse transit times of ultrasonic pulses travelling downstream and upstream relative to the flow direction f can be measured, and by using the difference in transit times or inverse transit times the flow velocity is determined; and at least one absolute transit time of ultrasonic pulses is measured, and by using the at least one absolute transit time the one or more characteristic parameter(s) of the channel is or are determined. In particular, the ultrasonic flowmeter can be designed to provide at least four ultrasonic signal paths between two ultrasonic transducers, and the processor can be configured to determine and eliminate the electronic signal transit times occurring in the first ultrasonic transducer during signal sending $\varepsilon_{1,send}$, in the second ultrasonic transducer during signal receiving $\varepsilon_{2,receive}$, in the second ultrasonic transducer during signal sending $\varepsilon_{2,send}$, and in the first ultrasonic transducer during signal receiving $\varepsilon_{1,receive}$.

A further aspect of the invention is related to a computer program product comprising a non-transitory computer-readable medium having stored thereon computer program code configured to control a processor of an ultrasonic flowmeter for or of an ultrasonic flow measurement system to perform the method for measuring a flow of fluid through a channel as disclosed herein.

Another aspect of the invention is related to a variable or constant air volume system for heating, ventilating, and air conditioning, the air volume system comprising a flow measurement system as disclosed herein. In embodiments, a constant or variable air volume system can for example be implemented and be useful in fan coils, reheat units, or air enthalpy monitoring. In general, the flow measurement system could be implemented and be useful in any application in which a damper and/or valve(s) is or are used to condition air.

BRIEF DESCRIPTION OF THE DRAWINGS

The present invention will be explained in more detail, by way of non-limiting examples, with reference to the schematic drawings in which.

DETAILED DESCRIPTION OF EMBODIMENTS

Figure 7:
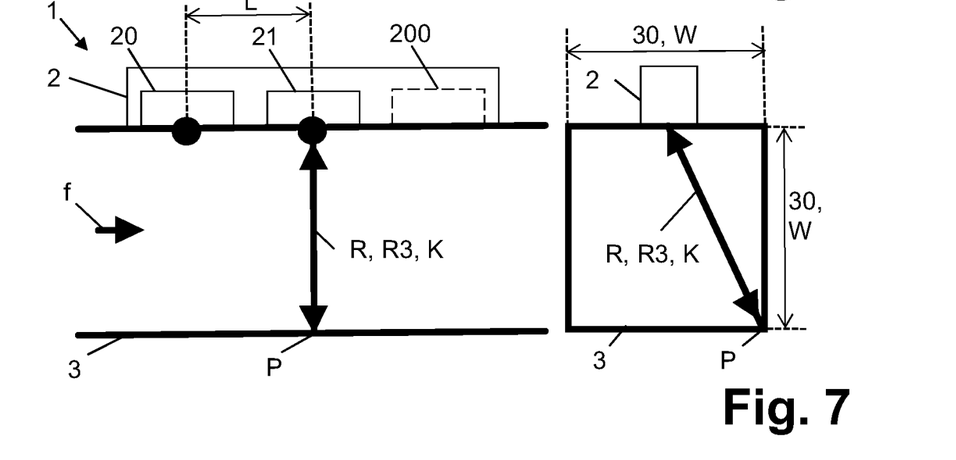
Figure 8:
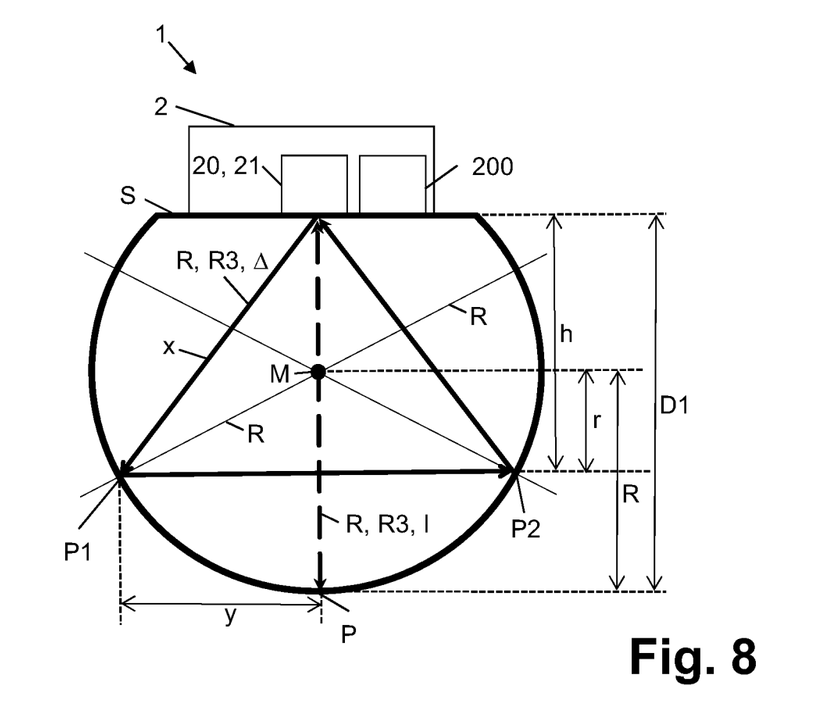
FIG. 8 shows in cross-sectional view a flow measurement system or method in a partially round channel using both an I-shaped and delta-shaped path of ultrasonic transmission for determining channel dimensions.

The invention can be implemented using time-of-flight measurement using an ultrasonic flowmeter 2 for determining an average velocity in air. The ultrasonic flowmeter 2 may be equipped with ultrasonic transducers 20, 21 operating in a range of 20 kHz to 40o kHz and preferably at 40 kHz. The ultrasonic transducers 20, 21 are preferably capable to emit and receive ultrasonic signals. They are mounted on channels 3 typically having round cross sections (FIG. 1-FIG. 4b) or rectangular or quadratic cross sections (FIG. 5-FIG. 7) or combinations of round and polygonal cross sections (FIG. 8). The channel 3 may have bore holes at mounting positions of the transducers 20, 21 to avoid attenuation of ultrasonic signals by the channel wall. The ultrasonic transducers 20, 21 preferably have a broad emission characteristic (or emission angle) and/or receiving characteristic (or receiving angle) to allow measurement and assessment of a plurality of ultrasonic signal paths. The paths can be or comprise reflective paths R; R1, R2, R3 which include one or more reflection points or reflecting areas P, P1, P2, P3. Alternatively or in addition, the ultrasonic signal paths can also be or comprise direct paths (not shown).

Figure 1A:
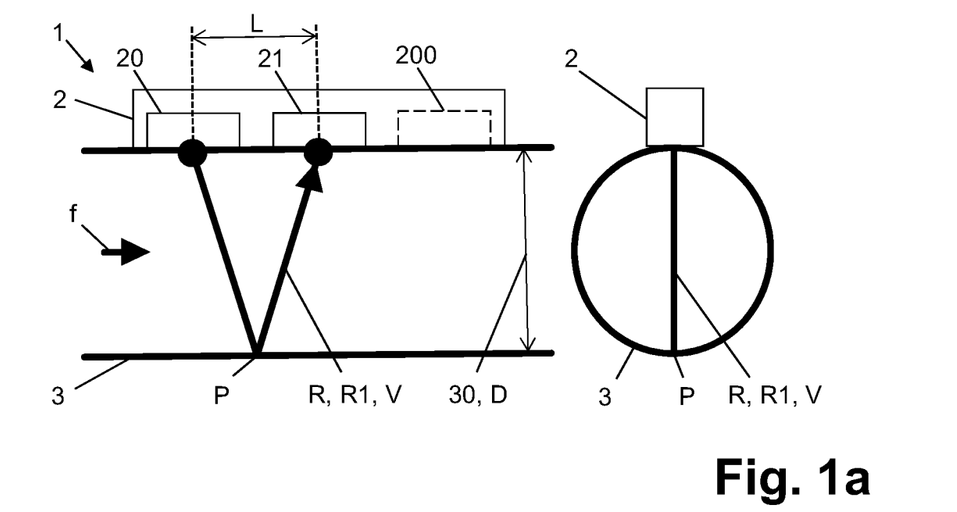
FIG. 1a, 1b show in lateral view (on the left) and cross-sectional view (on the right) a flow measurement system or method for measuring a fluid flow in a round channel by using a V-shaped path of ultrasonic transmission.
Figure 1B:
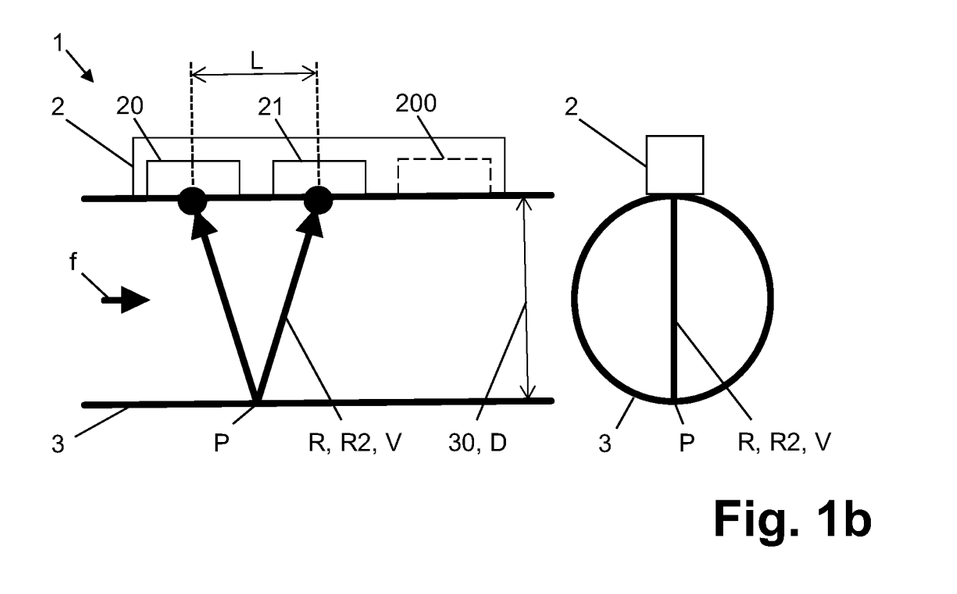

FIG. 1a, 1b show an exemplary embodiment of a flow measurement system a according to the invention, comprising an ultrasonic flowmeter 2 for measuring a flow of fluid having a flow direction f through a channel 3. A channel cross section can be characterized by at least one characteristic parameter 30, here a diameter D in case of a round shape. However, arbitrary shapes of the channel cross section are in general possible and can be characterized by one or more suitable characteristic parameter(s) 30. The ultrasonic flowmeter 2 comprises at least two and preferably exactly two ultrasonic transducers 20, 21 that are arranged at a distance L from each other, when the ultrasonic flowmeter 2 is mounted to the channel 3. The ultrasonic transducers 20, 21 are configured to emit ultrasonic pulses into the channel 3 and to receive ultrasonic pulses from the channel 3. The ultrasonic flowmeter 2 further comprises a processor 200 that is connected to the two ultrasonic transducers 20, 21 and is configured to measure transit times of the ultrasonic pulses in the channel 3 in such a manner that a flow velocity of the fluid and, in conjunction with other embodiments such as shown e.g. in FIGS. 3a, 3b, 5, 6, 7, the one or more characteristic parameter(s) 30 of the channel 3 can be determined by using the transit times.

For the purpose of determining the flow velocity, the two ultrasonic transducers 20, 21 can in general be arranged to emit and receive first ultrasonic pulses traveling along a first path R1 downstream the flow direction f and second ultrasonic pulses traveling along a second path R2 upstream the flow direction f, and the processor can be configured to measure a difference in transit times or inverse transit times of the first and second ultrasonic pulses and to determine the flow velocity by using the measured difference in transit times or inverse transit times.

Figure 2:
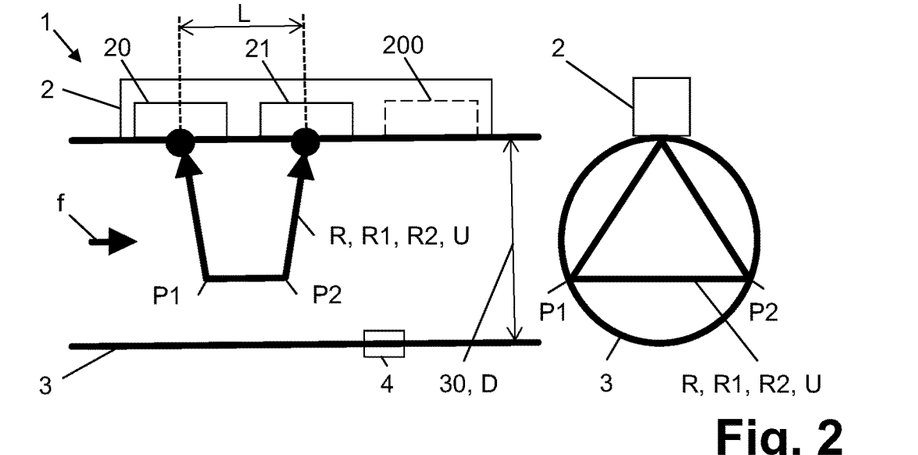
FIG. 2 shows in lateral view (on the left) and cross-sectional view (on the right) a flow measurement system or method for measuring a fluid flow in a round channel using a U-shaped or quasi-helical path of ultrasonic transmission.

As shown, the first path R1 can be a V-shaped path V (FIG. 1a, 4a) or a U-shaped or quasi-helical-shaped path U (FIG. 2) in downstream direction, and the second path R2 can be a V-shaped path V (FIG. 1b, 4b) or a U-shaped or quasi-helical-shaped path (FIG. 2) in upstream direction. A U-shaped path can in particular be considered as a specific quasi-helical path having at least two reflection points P1, P2 and running between the transducers 20,21, as shown in FIG. 2. Quasi-helical means that the path comprises a sequence of linear segments that are arranged in a helical manner and approximately form a helical shape, e.g. in one turn (FIG. 2) or more turns (not shown) around a central channel axis. Quasi-helical paths are e.g. possible in channels 3 having round cross sections, providing e.g. a triangular or delta shape Δ when seen in cross-sectional plan view (FIG. 2), or in channels 3 having rectangular cross sections, providing e.g. a diamond or quadrilateral shape Q when seen in plan view (not shown). First and second paths having multiple reflection points P are possible, as well. An optional temperature sensor 5, which allows to measure a temperature and determine a speed of sound of the fluid or gas, can be present in any embodiment disclosed herein and is exemplarily shown in FIG. 2.

Preferably, the first path R1 and the second path R2 are congruent, i.e. are identical in shape and counter-directional to one another. Differently shaped first paths R1 and/or differently shaped second paths R2 can also be used separately or in combination.

For the purpose of determining the one or more characteristic parameter(s) 30 of the channel 3, the two ultrasonic transducers, preferably the same two ultrasonic transducers 20, 21, can in general be arranged to emit and receive third ultrasonic pulses traveling along a third path R3, which is orthogonal to the flow direction f or has third path components in and against flow direction f that substantially or exactly compensate one another, and the processor 200 can be configured to measure an absolute transit time of the third ultrasonic pulses and to determine, by using the absolute transit time, the one or more characteristic parameter(s) 30 of the channel 3.

As shown in FIGS. 3a, 3b, 5, 6, 7, the third path R3 can preferably start and end at the same ultrasonic transducer 20, 21. Furthermore, the processor 200 can determine, based on the flow velocity $v_V$ of the fluid and the characteristic parameter(s) 30 of the channel 3, the average velocity and volume fluid flow automatically or semi-automatically, or in certain cases the characteristic parameter(s) 30 or the shape and/or dimension(s) of the channel cross section derived therefrom can also be input manually, or it can be determined using additional sensors or equipment.

The third path R3 can preferably be chosen to lie in a plane orthogonal to the flow direction f. The third path R3 can be selected from the group consisting of: single-pass I-shaped path (not shown), double-pass I-shaped path I (FIG. 3a, FIG. 5); triangular-shaped path Δ (FIG. 3b); diamond-shaped path Q (FIG. 6); double-pass K-shaped path K comprising a reflection point P at an edge region of the channel 3 (FIG. 7). Differently shaped third paths R3 can also be used in combination. Thus, third paths having a single reflection point P (FIG. 3a, FIG. 5, FIG. 7) or multiple reflection points P1, P2, P3 (FIG. 3b, FIG. 6) are also possible.

The K-shaped path R3, K shown in FIG. 7 has the advantage that an already existing edge of the channel 3 can be used as an efficient reflector for ultrasonic waves with good directional or collimating retroreflecting properties. Preferably, the edge region is formed in a joining region of two or three substantially mutually vertical walls of the channel 3, thereby using the edge region as a corner cube reflector for the ultrasonic waves.

In the following, an example of dimension-independent measurement of an average flow velocity is given for the first and second path R1, R2 having a V-shape (FIG. 1a, 1b; 4a, 4b) in combination with the third path R3 having an I-shape (FIG. 3a) in a channel 3 with round cross section of diameter D, 30. As a variation of this example, it is also possible e.g. to use delta-shaped and U-shaped paths. The third ultrasonic pulses travelling along the third path R3, I return to the transducer 21 where they have been emitted from. In addition, they can share the receiver of the second ultrasonic transducer 22 for the first ultrasonic pulses travelling downstream along the first path R1, V; and/or they can share the emitter of the second ultrasonic transducer 22 for the second ultrasonic pulses travelling upstream along the second path R2, V.

Figure 3A:
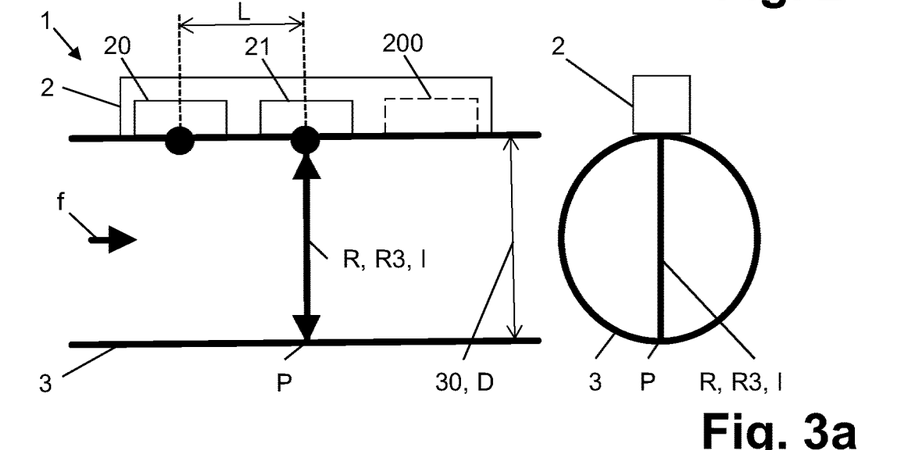
FIG. 3a shows in lateral view (on the left) and cross-sectional view (on the right) a flow measurement system or method using an I-shaped path of ultrasonic transmission for determining a channel dimension.
Figure 3B:
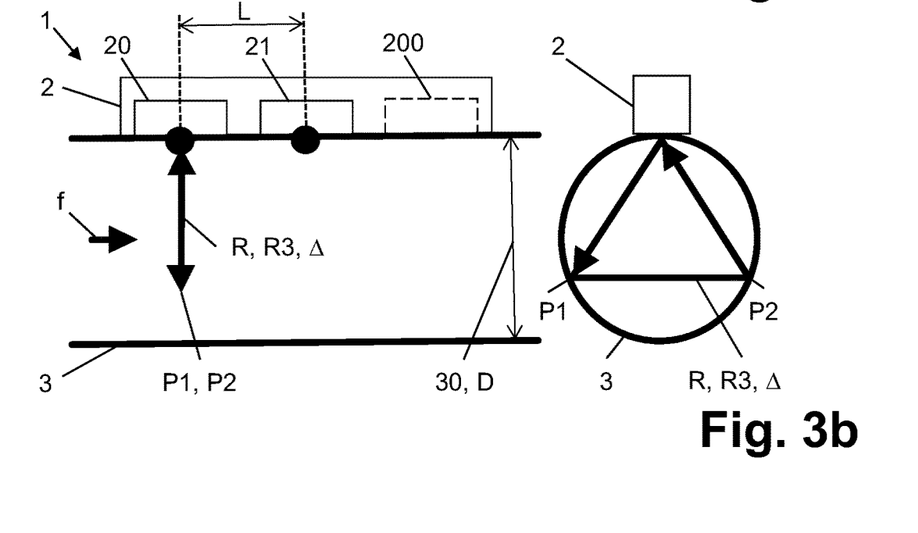
FIG. 3b shows in lateral view (on the left) and cross-sectional view (on the right) a flow measurement system or method in a round channel using a delta-shaped path of ultrasonic transmission for determining a channel dimension.

In the example, the I-shaped path I extends along the diameter D and has a length $s_I=2D$. The processor 200 can be configured to measure the absolute transit time $t_I$ for the length $s_I$ of the I-shaped path I, in particular by averaging plural measurements of the absolute transit time $t_I$, and to determine the diameter D using the first relationship $D=s_I/2=t_Ic/2$, with c=speed of sound in the fluid. Furthermore, the first and second V-shaped paths R1, R2 have a length $s_V=\sqrt{L^2+4D^2}$ (second relationship), wherein L=distance between the first ultrasonic transducer 20 and the second ultrasonic transducer 21 measured along the channel direction or flow direction f. The processor 200 can be configured to measure a first transit time $t_{Vdown}$ along a length $s_V$ of the first path R1, V and a second transit time $t_{Vup}$ along a length $s_V$ of the second path R2, V and to determine an average flow velocity $v_V$ of the fluid using the third relationship $$v_V = \frac{s_V^2}{2L}\left(\frac{1}{t_{V\_up}} - \frac{1}{t_{V\_down}}\right) = \frac{s_V^2}{2L}\left(\Delta\frac{1}{t_V}\right).$$

The processor 200 can be configured to determine the speed of sound c using the fourth relationship $$c = \frac{s_V\left(\frac{1}{t_{V\_up}} + \frac{1}{t_{V\_down}}\right)}{2} = \frac{s_V\left(\Sigma\frac{1}{t_v}\right)}{2}.$$

The processor can further be configured to determine the average flow velocity $v_V$ of the fluid independently from the speed of sound c and thus independently from the temperature of the fluid by using, derivable from the above relationships, the fifth relationship $$v_V = \frac{L}{2}\frac{\left(\Delta\frac{1}{t_V}\right)}{\left(1-\left(\frac{t_I}{2}\Sigma\frac{1}{t_v}\right)^2\right)}.$$

This (fifth) relationship allows to determine the average flow velocity $v_V$ of the fluid solely from the distance L between the first and second ultrasonic transducer 20, 21 and the time-of-flight or transit time measurements $t_{Vdown}$, top along the V-path and $t_I$ along the I-path. The measurement accuracy can further be improved, when instead of the transit time $t_I$ of one I-path to and from the second ultrasonic transducer 21 or to and from the first ultrasonic transducer 20, the transit times $t_I$ of both I-paths to and from the second and the first ultrasonic transducer 21, 20, respectively are used. As well, delta-shaped paths Δ or other-shaped paths can be used as an alternative or in addition to the I-shaped path(s).

Furthermore, a calibration system and calibration method and embodiments thereof are disclosed. Calibration of the flow measurement system 1 is normally done by comparing measured flow values with reference flow values. Thereby, measurement errors or deviations, including those originating from properties of the channel 3 such as channel diameter or the like, can be reduced or eliminated. This usually requires performing calibration only after installation of the flowmeter 2 on the installation site on the actual channel 3 to be monitored.

In the calibration system and calibration method disclosed herein, flow measurements at varying flow velocities need not be made any more. Instead, a calibration factor k or a calibration function, respectively, is obtained using a reference temperature at a reference geometry or reference channel (different from an actual channel 3). Deviations of transit times versus theoretical transit times are determined under these conditions. Such deviations originate from sample variations of the ultrasonic transducer properties and of the flowmeter electronics, both together herein resulting in electronic signal transit times. In complete generality, the flowmeter electronics may be implemented e.g. in the processor 200 and/or in the ultrasonic transducers 20, 21 and/or elsewhere. After correction of the deviations of the electronic signal transit times, the measured transit times correspond to or are equal to the physical transit times of the ultrasonic waves or pulses travelling in or along or across the channel 3. Then, the other quantities, such as characteristic parameter(s) 30 of the channel, channel cross section (i.e. shape and size or dimensions), average fluid velocity, fluid volume flow, etc. can be determined with very high or improved precision, in particular when taking the environmental temperature into account.

Figure 4A:
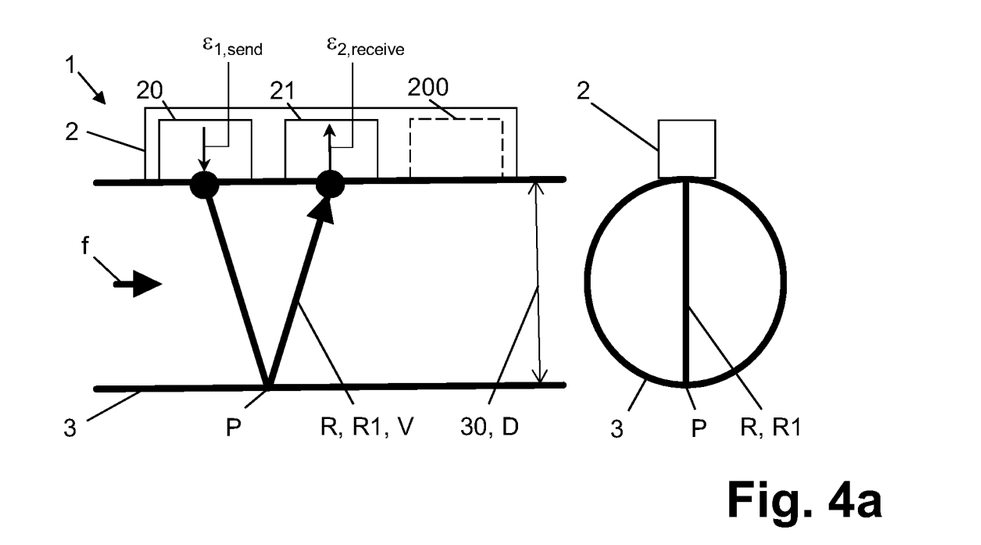
FIG. 4a, 4b show in lateral view (on the left) and cross-sectional view (on the right) a further aspect or embodiment of a flow measurement system or method with improved calibration of the flowmeter.
Figure 4B:
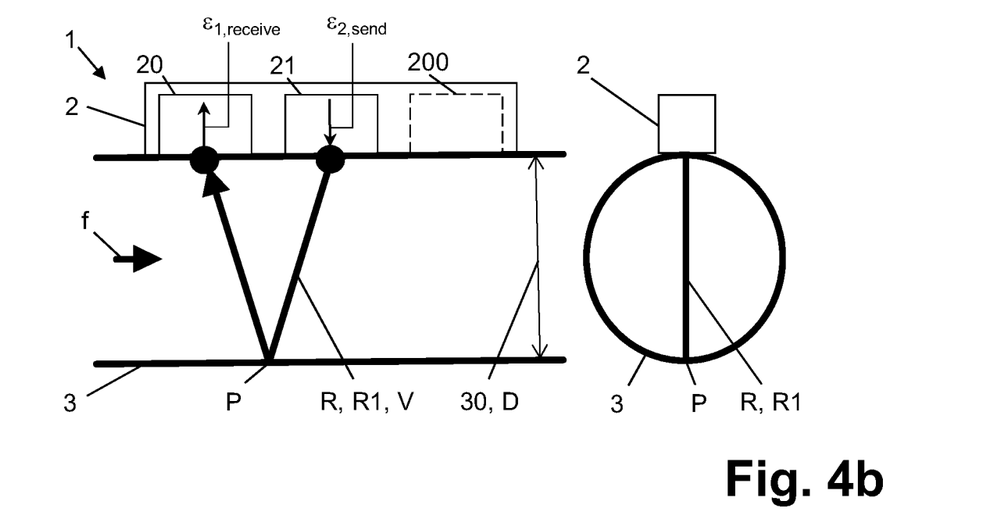

FIG. 4a, 4b show embodiments relating to such a calibration system and calibration method, which is applicable as an alternative or in addition to the embodiments disclosed herein, e.g. for a reference channel 3 and/or an actual channel 3 to be monitored having a round cross section. Other channel geometries, e.g. rectangular or other, are possible, as well. The total transit times of a transmission path of an ultrasonic signal is composed of the physical transit time of the ultrasonic pulses travelling through the fluid, here air, in the channel 3 and of the electronic signal transit times occurring in the transducers 20, 21 and electronics of the ultrasonic flowmeter 2.

Thus in a flow measurement system comprising an ultrasonic flowmeter, or in an ultrasonic flowmeter designed for use in such a flow measurement system, or in the method for measuring a flow of fluid through a channel 3 by using a flow measurement system a comprising an ultrasonic flowmeter 2, in particular the method as disclosed herein, the ultrasonic flowmeter 2 comprises at least two ultrasonic transducers 20, 21 that are arranged at a distance L from each other, when the ultrasonic flowmeter 2 is arranged at the channel 3, and the ultrasonic flowmeter 2 further comprises a processor 200 connected to the two ultrasonic transducers 20, 21, wherein ultrasonic pulses are emitted into the channel 3 and ultrasonic pulses are received from the channel 3 by the at least two ultrasonic transducers 20, 21, and in the processor 200 transit times of the ultrasonic pulses in the channel 3 are measured and a flow velocity $v_F$ of the fluid is determined by using the transit times, the method may comprise calibration steps of: determining in the processor 200 an electronics-uncompensated calibration function for the volume flow versus transit times by using a characteristic parameter(s) 30 of the channel 3 or a reference channel of known geometry and by using a measured temperature or a reference temperature of the fluid, and further determining, using the electronics-uncompensated calibration function, an electronics-compensated calibration function for compensating electronic signal transit times occurring in the electronic signal paths of the ultrasonic flowmeter 2.

In embodiments, the flow measurement system or the ultrasonic flowmeter or the calibration steps can comprise further: designing the ultrasonic flowmeter 2 to provide at least four ultrasonic signal paths between two ultrasonic transducers 20, 21, configuring the processor 200 to determine and eliminate or compensate or standardize in the electronics-compensated calibration function the electronic signal transit times occurring in the first ultrasonic transducer 20 (upstream or top transducer 20 with respect to flow direction f) during signal sending $\varepsilon_{1,send}$, in the second ultrasonic transducer 21 (downstream or bottom transducer 21 with respect to flow direction f) during signal receiving $\varepsilon_{2,receive}$, in the second ultrasonic transducer 21 during signal sending $\varepsilon_{2,send}$, and in the first ultrasonic transducer 20 during signal receiving $\varepsilon_{1,receive}$. In particular, the electronics-compensated calibration function can be implemented by software, e.g. software residing in the processor 200.

In embodiments of the calibration system and calibration method disclosed herein, the four ultrasonic signal paths between two ultrasonic transducers 20, 21 can comprise: a first path, in particular V-shaped, U-shaped or quasi-helical path, in downstream direction and running between two different ultrasonic transducers 20, 21; a second path, in particular V-shaped, U-shaped or quasi-helical path, in upstream direction and running between the two different ultrasonic transducers 21, 20; a third path, in particular I-shaped or delta-shaped or quadrilateral-shaped or K-shaped path, running to and from a first 20 of the two ultrasonic transducers 20, 21, e.g. arranged at a top or upstream position at the channel 3; and a fourth path, in particular I-shaped or delta-shaped or quadrilateral-shaped or K-shaped path, travelling to and from a second 21 of the two ultrasonic transducers 20, 21, e.g. arranged at a bottom or downstream position at the channel 3. This allows to obtain a first, second, third and fourth transit time, from which, by using the absolute channel dimension(s) (known, measured or determined as disclosed herein) and the speed of sound in the fluid (known, measured or determined as disclosed herein) and flow velocity (known, measured or determined as disclosed herein), the four electronic signal transit times $\varepsilon_{1,send}$, $\varepsilon_{2,receive}$, $\varepsilon_{2,send}$, $\varepsilon_{1,receive}$ can be determined in an unequivocal manner. In further embodiments, by using more than the first, second, third and fourth ultrasonic signal paths and/or more than the two ultrasonic transducers 20, 21, the determination of the four electronic signal transit times $\varepsilon_{1,send}$, $\varepsilon_{2,receive}$, $\varepsilon_{2,send}$, $\varepsilon_{1,receive}$ can be further improved, e.g. by solving an over-determined set of equations e.g. by a least-square fit or similar method.

In embodiments, a second pair of a different first path, in particular V-shaped, U-shaped or quasi-helical path, in downstream direction and running between the first and second ultrasonic transducer 20, 21 and a different second path, in particular V-shaped, U-shaped or quasi-helical path, in upstream direction and running between the second and first ultrasonic transducers 21, 20 can be used to measure flow velocity and use the flow velocity when performing the calibration.

In embodiments, another second pair of a different third path, in particular I-shaped or delta-shaped or quadrilateral-shaped or K-shaped path, running to and from a first 20 of the two ultrasonic transducers 20, 21, e.g. arranged at a top or upstream position at the channel 3, and a different fourth path, in particular I-shaped or delta-shaped or quadrilateral-shaped or K-shaped path, travelling to and from a second 21 of the two ultrasonic transducers 20, 21, e.g. arranged at a bottom or downstream position at the channel 3, can be used to measure absolute channel dimension(s) and/or temperature and use this information when performing the calibration.

In further embodiments of the calibration system and calibration method disclosed herein, a temperature-dependence of the electronics-compensated calibration function can be corrected by using a reference temperature or temperature of the fluid and/or environment and/or electronics during normal operation, in particular as determined by using a temperature sensor and/or a speed of sound of the fluid in the channel 3 via time of flight measurement, as disclosed herein.

As a further embodiment, the calibration method of the electronics of the flowmeter 2 using four ultrasonic signal paths between two ultrasonic transducers 20, 21 can be combined with the flow measurement system 1 as disclosed herein and allowing determination of a characteristic channel parameter 30 using at least one third path R3 as an ultrasonic geometry-measuring path R3. Preferably, the third path R3 is running orthogonal to the flow direction f and along a return trip from and to one single ultrasonic transducer 21; 20.

In a further aspect of the invention, a method of operating the flow measurement system 1 can comprise any of the following steps:
  (a) calibration of the electronics of the flowmeter 2, by measuring and eliminating electronic signal transit times, in particular by using calibration steps as disclosed herein, during production, using a defined reference channel geometry and reference temperature;
  (b) fixing the flow measurement system 1 with flowmeter 2 on the channel 3 to be monitored, wherein the processor 200 can be mounted on the installation site or can be part of the flowmeter 2 or can be remote;
  (c) putting the flowmeter 2 into operation with selecting at least one of the input options: inputting no parameters; inputting a reference temperature measurement; inputting a channel geometry, e.g.: round, rectangular, size or dimension of the channel 3; determining a cross-sectional shape and/or size or dimension of the channel 3, e.g.: round, rectangular, partially round;
  (d) regular operation, providing at least one of: dimension-independent measurement of fluid velocity, determining volume flow, determining temperature without temperature sensor as disclosed herein, using a temperature sensor for determining a temperature and speed of sound c of the fluid as disclosed herein.

Figure 5:
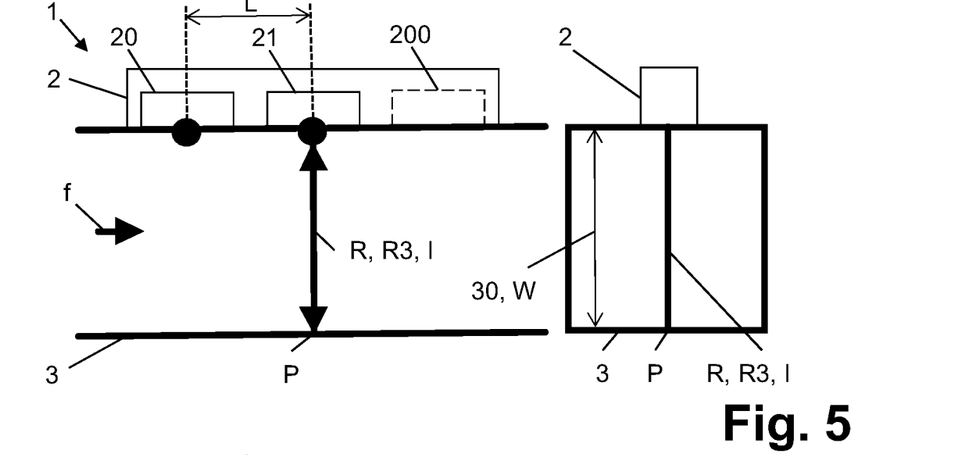
FIG. 5, 6, 7 show in lateral view (on the left) and cross-sectional view (on the right) a flow measurement system or method in a rectangular channel using an I-shaped or diamond-shaped or K-shaped path of ultrasonic transmission for determining at least one channel dimension.
Figure 6:
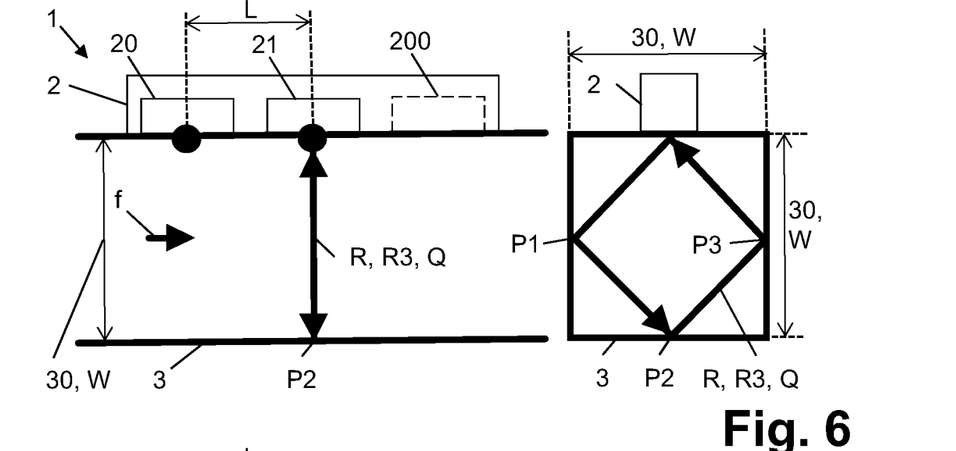

FIGS. 5 and 6 relate to a further embodiment showing a flow measurement system 1 and method for determining two characteristic parameters 30, W of a channel 3 with rectangular, here quadratic, cross section, thus having a (vertical) height W and (horizontal) width W. The channel geometry can be programmed by the user or may be determined by two third paths R3, here e.g. an I-shaped path I (FIG. 5) and a diamond-shaped path Q (FIG. 6), each running along a return trip from and to one ultrasonic transducer 21, preferably the same ultrasonic transducer 21 (or alternatively along separate return trips from and to the first and second ultrasonic transducer 21, 20, respectively). By measuring a first transit time along one or both I-shaped paths I and taking a reference temperature into account, the height W of the channel 3 can be determined. Using the height W and measuring a second transit time along the diamond-shaped path Q, the width W can also be determined. Thus again, comparable as in the above embodiments, measuring the shape or geometry and absolute size or dimension of the rectangular channel 3 allows to determine from the average flow velocity the volume flow of the fluid with high accuracy.

FIG. 8 relates to another embodiment showing a flow measurement system a and method for determining two characteristic parameters 30; D, D1 of a channel 3 with partially round cross section having a flat edge along a secant S, thus having a diameter D=2R with R=radius of the round cross-sectional part and a reduced or partial diameter D1 running through a midpoint M and orthogonal to the secant S of the channel cross section.

For determining D and D1, the transit time along the I-shaped path running along the partial diameter D1 and the transit time along the delta-shaped path Δ of circumference U running symmetrically with respect to the midpoint M and the I-path can be measured. In particular, the delta-shaped path Δ can be selected to form an isosceles or equilateral triangle. By making reference to FIG. 8, the following five geometric relationships can then be established between five un-known geometric parameters, i.e. x, h, R, y, and r as follows:

(a) I–path: $I = h - r + R$ (b) delta–path: $U = 2x + 2y$ (c) Pythagoras: $R = \sqrt{r^2 + y^2}$ (d) Pythagoras: $h = \sqrt{x^2 - y^2}$ (e) theorem of intersecting lines: $\dfrac{h-r}{r} = \dfrac{x}{y}$ From this equation system, R and I (=distance from the first or second ultrasonic transducer 21 or 20 to the opposite wall of the channel 3) can be found and thus the two characteristic parameters of the channel 3 are determined to be D=2R and D1=1.

In the examples shown in FIGS. 5 and 6 and 8 the ultrasonic transducer(s) 21, 22 has or have a broad ultrasonic emitter and receiver characteristic for simultaneously providing at least two third paths R3 selected from the group consisting of: I-shaped path I, diamond-shaped path Q, delta-shaped path Δ, other paths.

In an aspect of the invention, an ultrasonic flowmeter designed for use in a flow measurement system as disclosed herein or designed for use in a method for measuring a flow of fluid through a channel as is disclosed herein can be provided.

REFERENCE SYMBOLS

1 flow measurement system
2 ultrasonic flowmeter
20 first ultrasonic transducer
21 second ultrasonic transducer
200 processor
3 channel
30 characteristic parameter of channel, channel dimension, diameter, width, height, cross-sectional length, cross-sectional area, cross-sectional shape
4 temperature sensor
c speed of sound in gas
f flow direction of fluid or gas
L distance between ultrasonic transducers (measured along channel extension)
D cross-sectional extension, diameter
D1 diameter of round channel cross section, full diameter
D2 reduced diameter of partially round channel cross section with flattened part, partial diameter M midpoint of round or partially round channel cross section
S secant of partially round channel cross section
W cross-sectional extension, width, height of channel
R; R1, R2, R3 path of ultrasonic signal (continuous or quasi-continuous) or ultrasonic pulses
R1 first path, downstream path
R2 second path, upstream path
V V-shaped path
U U-shaped path, quasi-helical path
R3 third path, flow-independent path, orthogonal path
I I-shaped path
K K-shaped path
Δ delta-shaped path, triangular path
Q diamond-shaped path, quadrilateral path
$s_I$ length of double-pass I-shaped path
$t_I$ transit time along length of double-pass I-shaped path
$s_V$ length of V-shaped path between first and second ultrasonic transducer
$t_{V\_up}$ transit time along length of V-shaped path in upstream direction
$t_{V\_down}$ transit time along length of V-shaped path in downstream direction
$v_F$ average flow velocity of fluid (e.g. gas, air)
P; P1, P2, P3 reflection point, reflecting area, reflecting edge, reflector
$\varepsilon_{1,\ send}$ electronic signal transit time in sender of first ultrasonic transducer
$\varepsilon_{2,\ receive}$ electronic signal transit time in receiver of second ultrasonic transducer
$\varepsilon_{2,\ send}$ electronic signal transit time in sender of second ultrasonic transducer
$\varepsilon_{1,\ receive}$ electronic signal transit time in receiver of first ultrasonic transducer

The invention claimed is:

1. A flow measurement system comprising an ultrasonic flowmeter for measuring a flow of fluid through a channel, wherein the channel has an axial extension determining a flow direction of the fluid and a cross section characterizable by at least one characteristic parameter, the ultrasonic flowmeter comprising at least two ultrasonic transducers that are arranged at a distance from each other, when the ultrasonic flowmeter is fixed to the channel, and that are configured to emit ultrasonic pulses into the channel and to receive ultrasonic pulses in the channel, the ultrasonic flowmeter further comprising a processor connected to the two ultrasonic transducers,
wherein the at least two ultrasonic transducers are arranged to emit and receive ultrasonic pulses, and the processor is configured to measure transit times of the ultrasonic pulses in the channel in such a manner that a flow velocity of the fluid and the one or more characteristic parameter(s) of the channel are determined by using the transit times.

2. The flow measurement system according to claim 1, wherein ultrasonic signal paths between the at least two ultrasonic transducers are arranged such and the processor is configured such that an average flow velocity averaged over the cross section of the channel is determined.

3. The flow measurement system according to claim 1, wherein the processor is configured to determine at least one of: a cross-sectional shape of the channel, a cross-sectional area of the channel, a volume flow of the fluid, combinations thereof.

4. The flow measurement system according to claim 1, wherein the at least two ultrasonic transducers are arranged to emit and receive ultrasonic pulses traveling along at least two paths, that have different path lengths and/or different angular orientations with respect to the flow direction.

5. The flow measurement system according to claim 1, wherein the ultrasonic flowmeter comprises two ultrasonic transducers that are configured to measure transit times of ultrasonic pulses propagating downstream relative to the flow direction, of ultrasonic pulses propagating upstream relative to the flow direction, and of ultrasonic pulses propagating independently from the flow of fluid.

6. The flow measurement system according to claim 1, wherein the processor is configured to determine a speed of sound and therefrom a temperature of the fluid.

7. The flow measurement system according to claim 5, wherein the processor is configured to determine the flow velocity of the fluid independently from the speed of sound and independently from the temperature of the fluid.

8. The flow measurement system according to claim 1, wherein the two ultrasonic transducers are arranged to emit and receive first ultrasonic pulses traveling along a first path downstream the flow direction and second ultrasonic pulses traveling along a second path upstream the flow direction, and the processor is configured to measure a difference in transit times or inverse transit times of the first and second ultrasonic pulses and to determine the flow velocity by using the measured difference in transit times or inverse transit times.

9. The flow measurement system according to claim 8, wherein the first path is or comprises a V-shaped path or U-shaped path or quasi-helical-shaped path in downstream direction, and the second path is or comprises a V-shaped path or U-shaped path or quasi-helical-shaped path in upstream direction.

10. The flow measurement system according to claim 8, wherein the first path and the second path are identical in shape and counter-directional to one another.

11. The flow measurement system according to claim 5, wherein the at least two or exactly two ultrasonic transducers are arranged to emit and receive third ultrasonic pulses traveling along a third path, which is orthogonal to the flow direction or has third path components in and against flow direction that compensate one another, and the processor is configured to measure an absolute transit time of the third ultrasonic pulses and to determine, by using the absolute transit time, the one or more characteristic parameters of the channel.

12. The flow measurement system according to claim 11, wherein the third path starts and ends at the same ultrasonic transducer.

13. The flow measurement system according to claim 11, wherein the third path is or comprises a single-pass or double-pass I-shaped path in a plane orthogonal to the flow direction; and/or the third path is or comprises a double-pass K-shaped path comprising a reflection point at an edge region of the channel.

14. The flow measurement system according to claim 13, wherein the I-shaped path extends along a diameter of a round cross section of the channel; or along a partial diameter running through a midpoint and orthogonal to a secant of a partially round cross section of the channel having a flat edge along the secant.

15. The flow measurement system according to claim 11, wherein the third path is or comprises a triangular-shaped path or diamond-shaped path in a plane orthogonal to the flow direction.

16. The flow measurement system according to claim 1, wherein the cross section of the channel has a shape comprising at least one of: a round shape, a partially round shape with at least one flattened face, a rectangular shape, a polygonal shape, and combinations thereof.

17. The flow measurement system according to claim 1, wherein the channel has a round cross section with a diameter D, the I-shaped path extends along the diameter D and has a length $s_I=2D$, wherein at least one of the ultrasonic transducers is arranged to emit and receive ultrasonic pulses along the I-shaped path, wherein the processor is configured to measure the absolute transit time $t_I$ for the length $s_I$ of the I-shaped path, in particular by averaging plural measurements of the absolute transit time $t_I$, and to determine the diameter D using the relationship $D=s_I/2=t_Ic/2$, with c=speed of sound in the fluid.

18. The flow measurement system according to claim 17, wherein two of the ultrasonic transducers are arranged at a distance L in flow direction from each other, the first path is a V-shaped path in downstream direction, the second path is the same V-shaped path in upstream direction, and the V-shaped path has a length $s_V=\sqrt{L^2+4D^2}$, wherein the processor is configured to measure a first transit time $t_{Vdown}$ along a length $s_v$ of the first path and a second transit time $t_{Vup}$ along a length $s_v$ of the second path and to determine an average flow velocity $v_V$ of the fluid using the relationship $$v_V = \frac{s_V^2}{2L}\left(\frac{1}{t_{V\_up}} - \frac{1}{t_{V\_down}}\right) = \frac{s_V^2}{2L}\left(\Delta\frac{1}{t_V}\right).$$

19. The flow measurement system according to claim 18, wherein the processor is configured to determine the speed of sound c using the relationship $$c = \frac{s_V\left(\frac{1}{t_{V\_up}} + \frac{1}{t_{V\_down}}\right)}{2} = \frac{s_V\left(\Sigma\frac{1}{t_v}\right)}{2}.$$

20. The flow measurement system according to claim 19, wherein the processor is configured to determine the average flow velocity $v_V$ of the fluid independently from the speed of sound c and thus independently from the temperature of the fluid by using the relationship $$v_V = \frac{L}{2}\frac{\left(\Delta\frac{1}{t_V}\right)}{\left(1-\left(\frac{t_I}{2}\Sigma\frac{1}{t_v}\right)^2\right)}.$$

21. The flow measurement system according to claim 1, wherein the ultrasonic flowmeter comprises at least two or exactly two ultrasonic transducers that are arranged at the channel at a known mutual distance and are configured to measure an absolute transit time along a known path shape across a cross section of the channel, the flow measurement system further comprises a temperature sensor configured to determine a temperature and speed of sound of the fluid in the channel, and the processor is configured to determine the one or more characteristic parameters of the channel, in particular a diameter or width of the channel, using the absolute transit time and the speed of sound of the fluid.

22. The flow measurement system according to claim 21, wherein the same two ultrasonic transducers are also configured to measure the transit times for determining the flow velocity of the fluid.

23. A flow measurement system according to claim 1, the ultrasonic flowmeter comprising at least two ultrasonic transducers that are arranged at a distance from each other, when the ultrasonic flowmeter is fixed to the channel, and that are configured to emit ultrasonic pulses into the channel and to receive ultrasonic pulses in the channel, the ultrasonic flowmeter further comprising a processor connected to the two ultrasonic transducers, wherein the at least two ultrasonic transducers are arranged to emit and receive ultrasonic pulses, and the processor is configured to measure transit times of the ultrasonic pulses in the channel in such a manner that a flow velocity of the fluid is determined by using the transit times, wherein the processor is configured to determine an electronics-uncompensated calibration function for the volume flow versus transit times by using a characteristic parameter of the channel or a reference channel of known geometry and by using a measured temperature or a reference temperature of the fluid, and the processor is further configured to determine, using the electronics-uncompensated calibration function, an electronics-compensated calibration function for compensating electronic signal transit times occurring in the electronic signal paths of the ultrasonic flowmeter.

24. The flow measurement system according to claim 23, wherein the ultrasonic flowmeter is designed to provide at least four ultrasonic signal paths between two ultrasonic transducers, and the processor is configured to determine and eliminate the electronic signal transit times occurring in the first ultrasonic transducer during signal sending, in the second ultrasonic transducer during signal receiving, in the second ultrasonic transducer during signal sending, and in the first ultrasonic transducer during signal receiving.

25. An ultrasonic flowmeter designed for use in the flow measurement system of claim 1.

26. A method for measuring a flow of fluid through a channel by using the flow measurement system according to claim 1, wherein the channel has an axial extension determining a flow direction of the fluid and a cross section characterizable by at least one characteristic parameter, the ultrasonic flowmeter comprising at least two ultrasonic transducers arranged at a distance from each other, when the ultrasonic flowmeter is fixed to the channel, and the ultrasonic flowmeter further comprising a processor connected to the two ultrasonic transducers, wherein the method comprises:

emitting ultrasonic pulses into the channel and receiving ultrasonic pulses from the channel by the at least two ultrasonic transducers, and measuring, by the processor, transit times of the ultrasonic pulses in the channel and determining a flow velocity of the fluid and the one or more characteristic parameters of the channel by using the transit times.

27. The method for measuring a flow of fluid through a channel according to claim 26, wherein in the processor a difference in transit times or inverse transit times of ultrasonic pulses travelling downstream and upstream relative to the flow direction is measured, and by using the difference in transit times or inverse transit times the flow velocity is determined; and/or at least one absolute transit time of ultrasonic pulses is measured, and by using the at least one absolute transit time the one or more characteristic parameter(s) of the channel is or are determined.

28. The method for measuring a flow of fluid through a channel according to claim 26, wherein in the processor at least one further method step is performed that is selected from: determining a cross-sectional shape of the channel, determining a cross-sectional area of the channel, determining a volume flow of the fluid; determining a speed of sound of the fluid, determining a temperature of the fluid, determining the flow velocity of the fluid independently from the speed of sound, determining the flow velocity of the fluid independently from the temperature of the fluid, and combinations thereof.

29. A method for measuring a flow of fluid through a channel according to claim 26, the ultrasonic flowmeter comprising at least two ultrasonic transducers arranged at a distance from each other, when the ultrasonic flowmeter is fixed to the channel, and the ultrasonic flowmeter further comprising a processor connected to the two ultrasonic transducers, wherein
ultrasonic pulses are emitted into the channel and ultrasonic pulses are received from the channel by the at least two ultrasonic transducers, and
in the processor transit times of the ultrasonic pulses in the channel are measured and a flow velocity of the fluid is determined by using the transit times,
the method comprising calibration steps of: determining in the processor an electronics-uncompensated calibration function for the volume flow versus transit times by using a characteristic parameter(s) of the channel or a reference channel of known geometry and by using a measured temperature or a reference temperature of the fluid, and further determining, using the electronics-uncompensated calibration function, an electronics-compensated calibration function for compensating electronic signal transit times occurring in the electronic signal paths of the ultrasonic flowmeter.

30. The method for measuring a flow of fluid through a channel according to claim 29, the calibration steps comprising the further steps of: designing the ultrasonic flowmeter to provide at least four ultrasonic signal paths between two ultrasonic transducers, configuring the processor to determine and eliminate in the electronics-compensated calibration function the electronic signal transit times occurring in the first ultrasonic transducer during signal sending, in the second ultrasonic transducer during signal receiving, in the second ultrasonic transducer during signal sending, and in the first ultrasonic transducer during signal receiving.

31. A non-transitory computer-readable medium having stored thereon computer program code which, when accessed and executed by a processor of an ultrasonic flowmeter for an ultrasonic flow measurement system, causes the processor to perform the method for measuring a flow of fluid through a channel according to claim 26, wherein the channel has an axial extension determining a flow direction of the fluid and a cross section characterizable by at least one characteristic parameter, the ultrasonic flowmeter comprising at least two ultrasonic transducers arranged at a distance from each other, such that ultrasonic pulses are emitted into the channel and ultrasonic pulses are received from the channel by the at least two ultrasonic transducers, when the ultrasonic flowmeter is fixed to the channel, and the processor being connected to the two ultrasonic transducers, such that
the processor is programmed to measure and store transit times of the ultrasonic pulses in the channel and further to determine a flow velocity of the fluid and the one or more characteristic parameters of the channel by using the transit times.

32. The non-transitory computer-readable medium according to claim 31, wherein the processor is programmed to perform at least one of the further method steps selected from: determining a cross-sectional shape of the channel, determining a cross-sectional area of the channel, determining a volume flow of the fluid; determining a speed of sound of the fluid, determining a temperature of the fluid, determining the flow velocity of the fluid independently from the speed of sound, determining the flow velocity of the fluid independently from the temperature of the fluid, determining an electronics-uncompensated calibration function for the volume flow versus transit times, using the electronics-uncompensated calibration function to determine an electronics-compensated calibration function for compensating electronic signal transit times occurring in the electronic signal paths of the ultrasonic flowmeter, and combinations thereof.

33. An air volume system for heating, ventilating, and air conditioning, the air volume system comprising the flow measurement system according to claim 1, wherein the air volume system is a variable air volume system or a constant air volume system.

* * * * *